Dec. 7, 1971  J. W. GILBAUGH  3,624,951
CAGE TYPE ANIMAL TRAP
Filed July 13, 1970  2 Sheets-Sheet 1
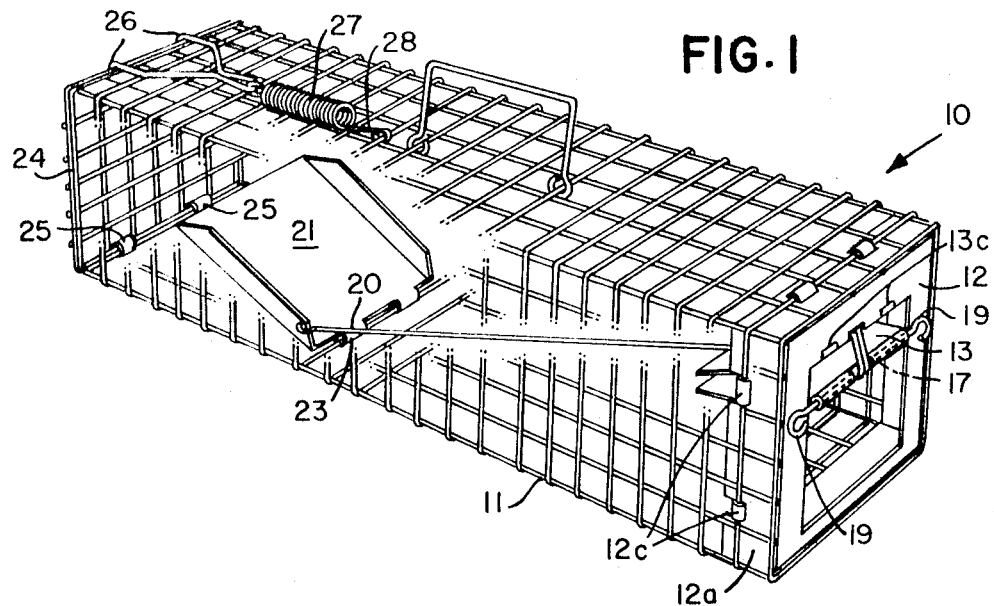
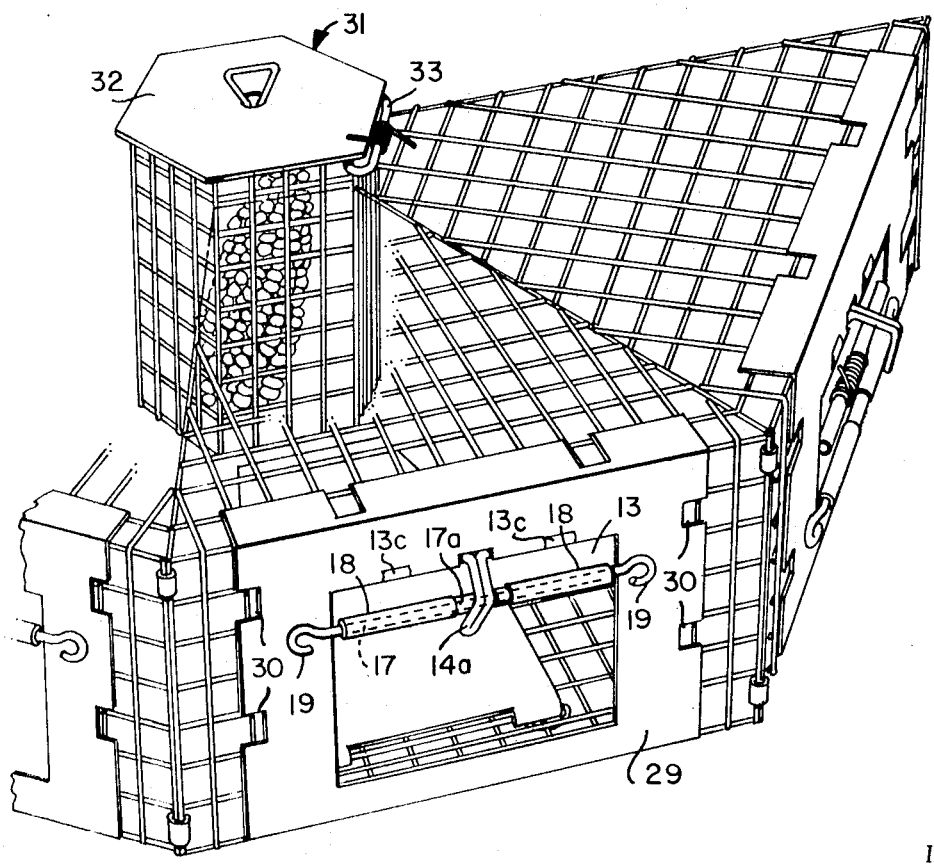
INVENTOR.
JOHN W. GILBAUGH
BY *Allen and Edmonds*
ATTORNEYS Dec. 7, 1971   J. W. GILBAUGH   3,624,951
CAGE TYPE ANIMAL TRAP
Filed July 13, 1970   2 Sheets-Sheet 2
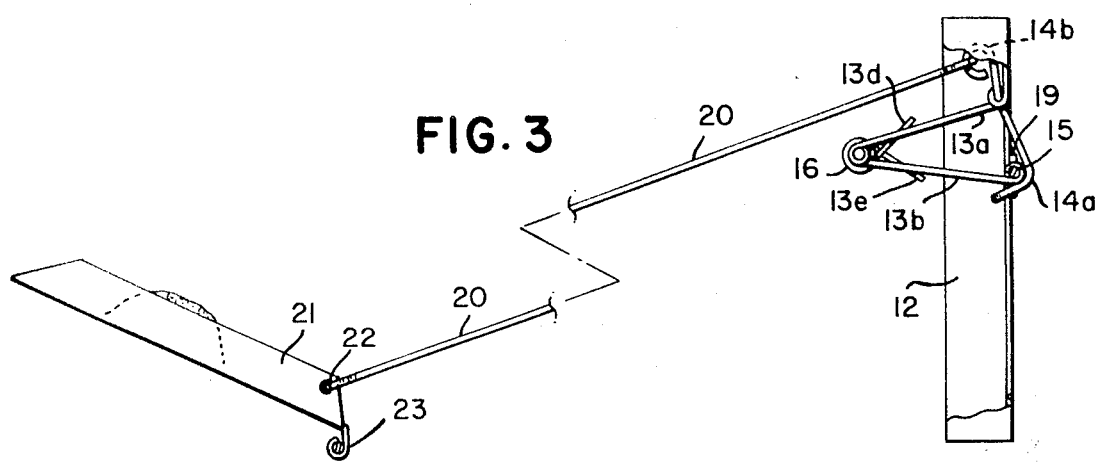
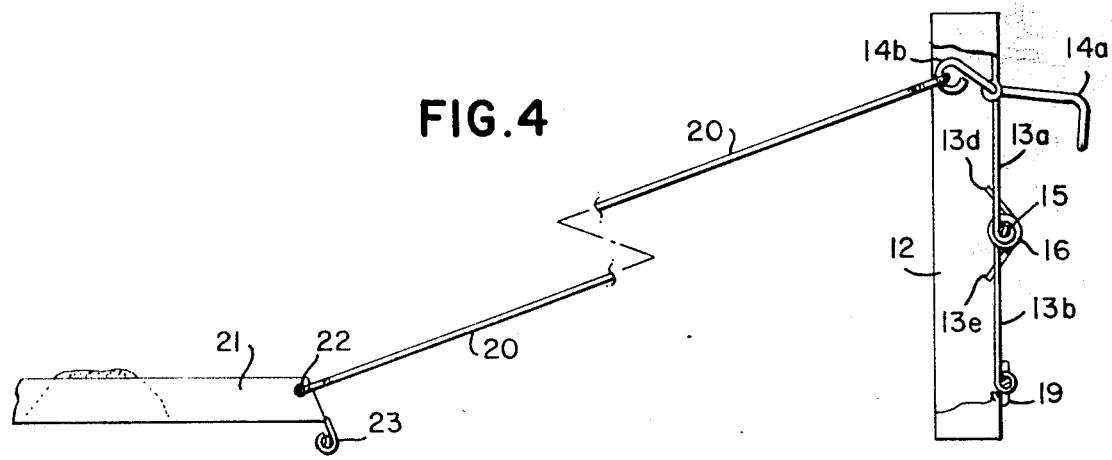
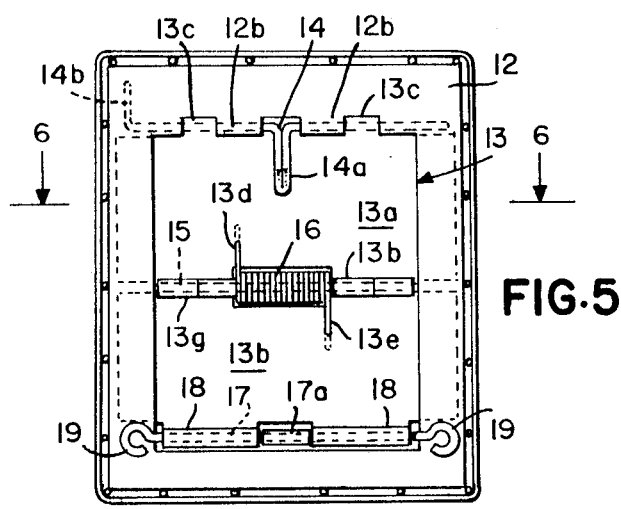
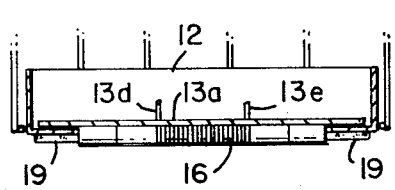
INVENTOR.
JOHN W. GILBAUGH
BY
Allen and Chromy
ATTORNEYS

United States Patent Office

3,624,951
Patented Dec. 7, 1971

3,624,951
CAGE TYPE ANIMAL TRAP
John W. Gilbaugh, 19396 Monte Vista Drive,
Saratoga, Calif. 95070
Filed July 13, 1970, Ser. No. 54,220
Int. Cl. A01m 23/04, 23/08, 23/18
U.S. Cl. 43—61                                            6 Claims

ABSTRACT OF THE DISCLOSURE

An animal trap is made in the form of a wire mesh cage provided with a door made in two sections hinged together. The upper part of the door is hinged to a door frame which is attached to the wire mesh cage. The hinge attaching the door to the door frame includes a wire member having a hook in the central portion thereof between hinge elements for latching the door in open position. One end of this wire member is in the shape of a lever attached to the trip mechanism which is actuated by the animal entering the cage so that the door latch is released and the door closed under spring pressure.

DESCRIPTION OF THE INVENTION

This invention replates to animal traps of the cage type.

An object of this invention is to provide an improved animal trap of the cage type made of wire mesh which may be economically and efficently manufactured and which is reliable in operation.

Another object of this invention is to provide an improved animal trap of the wire mesh cage type which is provided with a door frame and door assembly that may be easily and economically attached to the wire cage by simple attaching clips which are cut out of edge portions of the door frame.

Still another object of this invention is to provide an improved animal trap of the cage type with a door which is made in two sections that are hinged together, said door being adapted to be folded inward into the cage when it is opened and the hinge member attaching the door to the door frame also having a portion formed in the shape of a hook for latching the door in its open position.

Other and further objects of this invention will be apparent to those skilled in the art to which it relates from the following specification, claims and drawing.

In accordance with this invention there is provided an improved cage type trap which may be efficiently and economically manufactured and which is very reliable in operation. This trap is provided with a door that is made in two sections which are hinged together so that the upper and lower sections thereof are adapted to be folded substantially against each other when the door is open. The upper part of the door is attached to the door frame by a hinged member which is in the form of a rod or wire and the midportion thereof is shaped into a hook to latch the door in its open position. One end of this hinge member is bent substantially at right angles thereto to form a lever which is attached to the trip mechanism that is adapted to be released by animal entering the cage so that the hook is detached from the door and the door is rapidly extended into its full length and closed position by means of a coil spring that is positioned on the rod or wire member that serves as a hinge for attaching the door sections together. The door is positioned on the inside of the door frame and the bottom part of the door is provided with a rod the ends of which function as guides which extend over the outer side surfaces of the door frame. The ends of this rod are shaped to provide relatively large bearing surfaces on the outsides of the door frame to prevent jamming thereof during the closing of the door.

Further details and additional features of this animal trap will be set forth in the specification, claims and drawing in which briefly:

FIG. 1 is a perspective view partially broken away, of an embodiment of this invention with the trap door thereof shown in open position;

FIG. 2 is a modified embodiment of this invention showing a part of a multiple animal trap which is provided with more than one animal compartment;

FIG. 3 is a detail view of the trip mechanism showing the door latched in its open position;

FIG. 4 is a view similar to FIG. 3 showing the door in its closed position;

FIG. 5 is an end view of the trap shown in FIG. 1 with the door in its closed position; and FIG. 6 is a sectional view taken along the line 6—6 of FIG. 5.

Referring to the drawing in detail reference numeral 10 designates a cage type animal trap which is provided with a body 11 of wire mesh. One end of the cage is provided with a door frame 12 of sheet metal which is provided with an inwardly extending portion 12a that is fastened by parts 12c thereof to the end portion of the cage 11. The door 13 which is shown in its open position in FIG. 1, is attached to the frame 12 by the hinge pin 14 shown in FIG. 5. Generally tubular hinge elements 12b are formed by bending portions of the door frame 12 adjacent to the upper part of the door opening and similar tubular hinge elements 13c are formed by bending portions of the upper part of the door 13. These hinge elements 12b and 13c are resilient and the hinge pin 14 is pressed into them to complete the hinge when the door is assembled with the frame.

The door 13 is made in two sections 13a and 13b and the adjacent parts of these door sections are provided with integral hinge elements 13f and 13g formed from parts thereof for receiving the hinge pin 15. A coil spring 16 is positioned on a portion of pin 15 and this spring biases the door sections 13a and 13b into their closed position. The end portions 13d and 13e of the spring 16 are positioned in holes formed through the door sections 13a and 13b, respectively.

When the door 13 is to be open the sections 13a and 13b are folded towards each other against the tension of the spring 16 and the latch hook 14a, which is formed by bending the central part of the hinge pin 14 into a hook shape, is hooked around the tubular element 17a which is rotatably supported on the midportion of rod 17. Rod 17 is supported adjacent to the bottom of the door section 13b by the loops 18 formed by bending portions of door section 13b. The rod 17 is rotatable in the loops 18 so that the looped end portions 19 of this rod slidably engage the sides of the door frame 12 and guide the lower part of the door when it is being opened. The door 13 is made somewhat larger than the door opening in the frame 12 and thus the side portions of the door overlap the inside of the frame 12 when the door is closed.

The door hinge pin 14 is provided with a lever at one end thereof and the end of this lever is shaped into a loop 14b which is attached to one end of the door trip rod 20 and the other end of this rod is attached to the bait pan 21. A hole 22 is provided to the pan 21 for this purpose and the rod 20 is inserted into this hole which is spaced a short distance above the hinge 23. Tubular hinge portions are formed by bending portions of the bait pan 21 to receive one of the cross wires of the cage for rotatably supporting the pan on the bottom of the cage.

When the trap is set the door 13 is held in the open position by the latch hook 14a and the trip rod 20 holds the bait pan 21 in its elevated position as shown in FIG. 3. When an animal enters the cage and attempts to take some of the bait off of the pan 21, it depresses this pan to the lower position and in doing so causes the rod 20 to move the door latch 14a out of engagement with the roller 17a on rod 17 so that the spring 16 causes the door to close as shown in FIGS. 4 and 5.

The cage 10 is provided with a rear door 24 of wire mesh which is attached to the body 11 by hinge members 25 which may be formed by bending strips of metal into tubular shape around the bottom wire of the door and an end wire of the bottom of the cage. The door 24 is held closed by a member provided with hooks 26 which engage the top of the door when it is in closed position and hold the door firmly against the end of the cage. One end of the coil spring 27 is attached to the hook member and the other end 28 is provided with a loop which is attached to the top of the cage so that the tension of the spring 27 holds the hooks 26 in firm engagement with the top of the door when the door is in closed position. When it is desired to open the door 24 in order to remove an animal trapped in the cage the hooks 26 are pulled away from the top of the door against the tension of the spring 27 so that the door is released.

The embodiment of this invention shown in FIG. 1 is provided with only one animal receiving compartment and where it is desired to have an animal trap with several compartments the arrangement shown in FIG. 2 may be employed. In this embodiment of the invention the individual animal compartments are of generally triangular configuration and these compartments are separated from each other by wire mesh partitions. By making the cage of hexagonal configuration then six individual animal cages may be provided. Other configurations may of course be employed if desired. Each animal cage is provided with a door 13 such as provided to the cage shown in FIG. 1 and each door is provided with a door frame 29 which is similar to the door frame 12 shown in FIG. 1 except that the frame 29 is attached to the front of the cage by members 30 which are partially severed from the edge portions of the frame and hooked around adjacent wires of the cage.

The door latching and tripping mechanism of each compartment in the trap shown in FIG. 2, is the same as that shown in FIGS. 3 and 4 and the door latch of each animal compartment is released by a separate treadle.

A centrally disposed bait compartment 31 is provided to the multiple compartment type trap. This bait compartment is provided with a door 32 which also forms the top thereof and this door is attached to the cage by the hinge 33. The bait compartment is also made of wire mesh and it is made of the same geometric configuration as the assembly of animal compartments so that each compartment includes one wall of the bait compartment. Thus the bait is visible from each animal compartment through a wire mesh wall and when an animal enters a selected compartment then it must pass over the treadle before gaining access to the wire mesh wall of the bait compartment. In so doing it trips the latch mechanism holding the compartment door open thereby releasing the door into its closed position.

While I have shown and described a preferred form of the invention it will be understood that the invention is capable of variation and modification from the form shown so that the scope thereof should be limited only by the scope of the claims appended hereto.

What I claim is:

1. In an animal trap of the cage type the combination of a cage of wire mesh, a door frame, means attaching said door frame to said wire mesh, a door positioned on the inside of said frame, hinge means attaching the top of said door to said frame, said hinge means including a rotatable member having means projecting to the front of said door for latching said door in its raised open position, trip means positioned in said cage connected to said rotatable member, said last mentioned means being adapted to be actuated by an animal entering said cage through said open door, said last mentioned means rotating said latching means to release said door when it is actuated by said animal.

2. In an animal trap of the cage type, the combination as set forth in claim 1, further comprising another member supported on the bottom of said door and having end portions projecting over the outer sides of said door frame to guide the bottom of said door during the opening and closing thereof.

3. In an animal trap of the cage type, the combination as set forth in claim 2, further characterized in that said other member comprises a wire-shaped member having the ends thereof looped to provide a larger bearing surface thereto on said outer sides of said door frame.

4. In an animal trap of the cage type, the combination as set forth in claim 1, further characterized in that said means projecting to the front of said door is integral with the central portion of said rotatable member.

5. In an animal trap of the cage type, the combination as set forth in claim 1, further characterized in that said rotatable member comprises a wire-shaped member and said means projecting to the front of said door comprises a hook formed in the central portion thereof.

6. In an animal trap of the cage type, the combination as set forth in claim 5, further characterized in that said wire-shaped member comprising said hinge means is provided with a lever portion at one end thereof and said lever portion is connected to said trip means.

References Cited
UNITED STATES PATENTS

| Re. 7,798 | 7/1877 | Rice | 43—61 |
|---|---|---|---|
| 2,566,176 | 8/1951 | Ellis | 43—61 |
| 3,394,487 | 7/1968 | Wood et al. | 43—61 |
| 2,437,020 | 3/1948 | Ford | 43—61 |
| 1,093,880 | 4/1914 | Palmowski | 43—61 |
| 1,048,318 | 12/1912 | Kanter | 43—61 |

SAMUEL KOREN, Primary Examiner

J. F. PITRELLI, Assistant Examiner

U.S. Cl. X.R.

16—139; 160—4, 207